United States Patent
Drosback et al.

(10) Patent No.: US 10,914,374 B2
(45) Date of Patent: Feb. 9, 2021

(54) SHAPE-MEMORY ALLOY SHIFT ELEMENT FOR AN AUTOMATIC TRANSMISSION

(71) Applicant: ZF Friedrichshafen AG, Friedrichshafen (DE)

(72) Inventors: David Drosback, Greenville, SC (US); Abhishek Raydurga, Westfield, IN (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 20 days.

(21) Appl. No.: 16/106,731

(22) Filed: Aug. 21, 2018

(65) Prior Publication Data

US 2020/0063858 A1   Feb. 27, 2020

(51) Int. Cl.
  *F16H 63/30*   (2006.01)
  *F16H 61/02*   (2006.01)
  *F03G 7/06*    (2006.01)

(52) U.S. Cl.
  CPC ......... *F16H 61/0213* (2013.01); *F03G 7/065* (2013.01); *F16H 63/304* (2013.01); *F16H 2063/3083* (2013.01); *F16H 2716/08* (2013.01)

(58) Field of Classification Search
  None
  See application file for complete search history.

(56) References Cited

U.S. PATENT DOCUMENTS

| | | | | |
|---|---|---|---|---|
| 4,899,543 | A * | 2/1990 | Romanelli | F03G 7/065 294/103.1 |
| 5,992,834 | A * | 11/1999 | Dover | F16D 13/52 188/72.3 |
| 2007/0112326 | A1* | 5/2007 | Bosshard | A61M 5/145 604/500 |
| 2012/0175212 | A1* | 7/2012 | Hart | B60K 6/387 192/48.601 |
| 2016/0356378 | A1* | 12/2016 | Drosback | F16H 61/2807 |
| 2017/0023072 | A1* | 1/2017 | Tanaka | F16D 25/12 |
| 2018/0017120 | A1* | 1/2018 | Patil | F16D 55/40 |
| 2018/0031125 | A1* | 2/2018 | Chimbe | F16H 61/08 |
| 2018/0163794 | A1* | 6/2018 | Deneszczuk | F16D 25/0638 |

* cited by examiner

*Primary Examiner* — Justin Holmes
(74) *Attorney, Agent, or Firm* — Dority & Manning, P.A.

(57) ABSTRACT

A friction shifting element includes a plurality of first friction plates. A plurality of second friction plates is interleaved with the plurality of first friction plates. The friction shifting element also includes an actuating plate. A shape-memory alloy shifter is configured for moving the actuating plate along an axial direction between an engaged configuration and a disengaged configuration. The actuating plate compresses the plurality of first friction plates and the plurality of second friction plates together when the actuating plate is in the engaged configuration.

17 Claims, 3 Drawing Sheets

| GEAR | BRAKE A | BRAKE B | CLUTCH C | CLUTCH D | E | RATIO i | RATIO STEP |
|---|---|---|---|---|---|---|---|
| 1 | ● | ● | ● | | | 4.714 | |
| | | | | | | | 1.50 |
| 2 | ● | ● | | | ● | 3.143 | |
| | | | | | | | 1.49 |
| 3 | | ● | ● | | ● | 2.106 | |
| | | | | | | | 1.26 |
| 4 | | ● | | ● | ● | 1.667 | |
| | | | | | | | 1.30 |
| 5 | | ● | ● | ● | | 1.285 | |
| | | | | | | | 1.28 |
| 6 | | | ● | ● | ● | 1.000 | |
| | | | | | | | 1.19 |
| 7 | ● | | ● | ● | | 0.839 | |
| | | | | | | | 1.26 |
| 8 | ● | | | ● | ● | 0.667 | |
| | | | | | | | TOTAL |
| R | ● | ● | | ● | | -3.317 | 7.071 |

| GEAR | BRAKE | | CLUTCH | | | RATIO i | RATIO STEP |
|---|---|---|---|---|---|---|---|
| | A | B | C | D | E | | |
| 1 | ● | ● | ● | | | 4.714 | |
| | | | | | | | 1.50 |
| 2 | ● | ● | | | ● | 3.143 | |
| | | | | | | | 1.49 |
| 3 | | ● | ● | | ● | 2.106 | |
| | | | | | | | 1.26 |
| 4 | | ● | | ● | ● | 1.667 | |
| | | | | | | | 1.30 |
| 5 | | ● | ● | ● | | 1.285 | |
| | | | | | | | 1.28 |
| 6 | | | ● | ● | ● | 1.000 | |
| | | | | | | | 1.19 |
| 7 | ● | | ● | ● | | 0.839 | |
| | | | | | | | 1.26 |
| 8 | ● | | | ● | ● | 0.667 | |
| R | ● | ● | | ● | | -3.317 | TOTAL 7.071 |

SHAPE-MEMORY ALLOY SHIFT ELEMENT FOR AN AUTOMATIC TRANSMISSION

FIELD OF THE INVENTION

The present subject matter relates generally to automatic transmissions and shifting elements for automatic transmissions.

BACKGROUND OF THE INVENTION

Automatic transmissions generally include at least one planetary gear set and a plurality of shift elements. The shift elements selectively regulate rotation of components in the planetary gear sets. In particular, selective actuation of the shift elements adjusts the gear ratio of the automatic transmission and shifts the automatic transmission between its various gears.

Certain automatic transmissions include friction shifting elements. During various gear shifts, the friction shift element is engaged or closed. Engaging the friction shift element is generally performed by pressurizing a hydraulic piston. Thus, friction shift elements are generally hydraulically actuated. However, creating and maintaining the hydraulic pressure necessary to actuate friction shift elements can be difficult. In addition, hydraulically actuated friction shift elements can require compliance with strict cleanliness guidelines in order to prevent debris from negatively affecting performance of the friction shift elements. Further, hydraulically actuated friction shift elements generally include O-rings, drilled passageways through cast materials and other components that can necessitate a complex transmission design.

BRIEF DESCRIPTION OF THE INVENTION

Aspects and advantages of the invention will be set forth in part in the following description, or may be apparent from the description, or may be learned through practice of the invention.

In a first example embodiment, an automatic transmission is provided. The automatic transmission includes a plurality of planetary gear sets. A friction shifting element defines an axial direction. The friction shifting element includes a plurality of first friction plates. A plurality of second friction plates is interleaved with the plurality of first friction plates. The friction shifting element also includes an actuating plate. A shape-memory alloy shifter is coupled to the actuating plate. The shape-memory alloy shifter is configured for moving the actuating plate along the axial direction between an engaged configuration and a disengaged configuration. The actuating plate compresses the plurality of first friction plates and the plurality of second friction plates together when the actuating plate is in the engaged configuration. One of the plurality of first friction plates and the plurality of second friction plates is fixed to a gear of the plurality of planetary gear set.

In a second exemplary embodiment, a friction shifting element defines an axial direction. The friction shifting element includes a plurality of first friction plates. A plurality of second friction plates is interleaved with the plurality of first friction plates. The friction shifting element also includes an actuating plate. A shape-memory alloy shifter is coupled to the actuating plate. The shape-memory alloy shifter is configured for moving the actuating plate along the axial direction between an engaged configuration and a disengaged configuration. The actuating plate compresses the plurality of first friction plates and the plurality of second friction plates together when the actuating plate is in the engaged configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figures 1, 2:
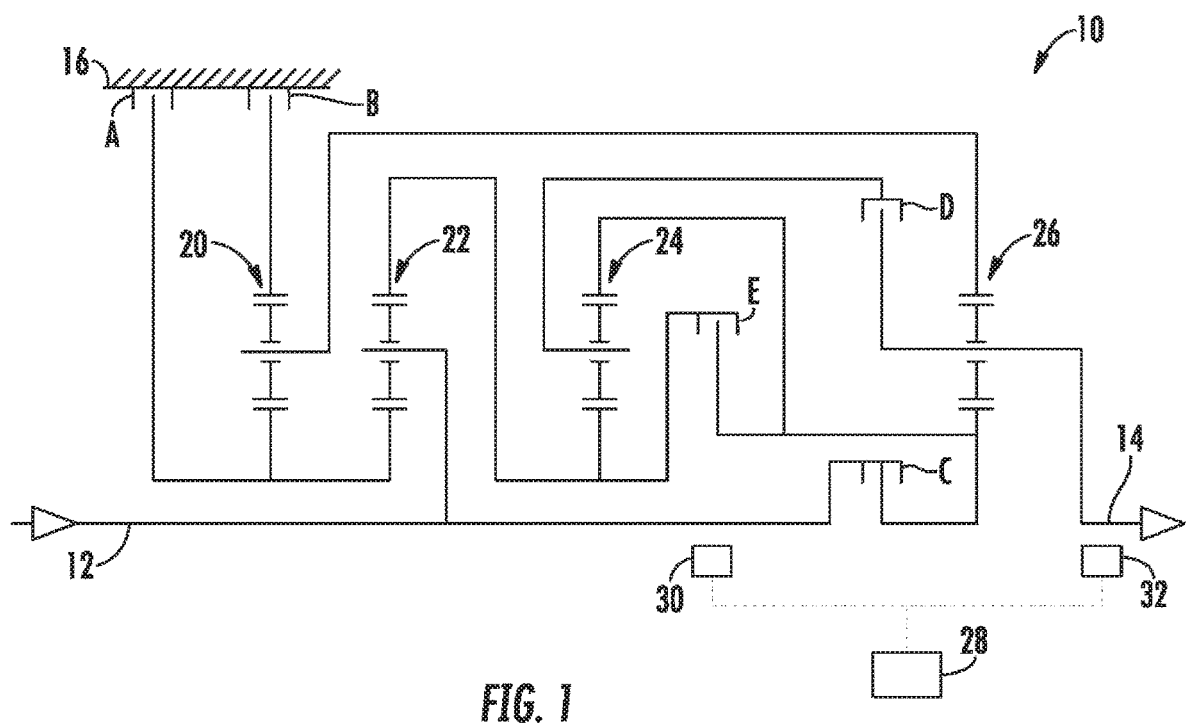
FIG. 1 is a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10 in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a drive shaft of the associated vehicle. Automatic transmission 10 may change gears in order to adjust the gear ratio between the motor and drive shaft of the associated vehicle.

Automatic transmission 10 also includes four planetary gear sets: a first planetary gear set 20; a second planetary gear set 22; a third planetary gear set 24 and a fourth planetary gear set 26. A carrier of second planetary gear set 22 is coupled or fixedly connected to input shaft 12. A sun gear of first planetary gear set 20 is coupled or fixedly connected to a sun gear of second planetary gear set 22. A carrier of first planetary gear set 20 is coupled or fixedly connected to a ring gear of fourth planetary gear set 26. A ring gear of second planetary gear set 22 is coupled or fixedly connected to a sun gear of third planetary gear set 24. A ring gear of third planetary gear set 24 is coupled or fixedly connected to a sun gear of fourth planetary gear set 26. In addition, a carrier of fourth planetary gear set 26 is coupled or fixedly connected to output shall 14.

As may be seen in FIG. 1, automatic transmission 10 further includes a plurality of shilling elements. In particular, automatic transmission 10 includes a plurality of friction shift elements or friction bands. In the exemplary embodiment of FIG. 1, the shifting elements include a multidisc brake A, a multidisc brake B, a multidisc clutch C, a multidisc clutch D and a multidisc clutch E. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the engaged configuration, the shilling elements couple two components together such that the two components have a common angular velocity. Conversely, in the disengaged configuration, the shifting elements do not couple the two components together and the two components can have different angular velocities. As may be seen in FIG. 1, multidisc brake A selectively connects or couples a transmission housing 16 to the sun gear of first planetary gear set 20 and the sun gear of second planetary gear set 22. Multidisc brake B selectively connects or couples transmission housing 16 to a ring gear of first planetary gear set 20. Multidisc clutch C selectively connects or couples input shaft 12 to the ring gear of third planetary gear set 24 and the sun gear of fourth planetary gear set 26. Multidisc clutch D selectively connects or couples a carrier of third planetary gear set 24 to the carrier gear of fourth planetary gear set 26 and output shaft 14. Multidisc clutch E selectively connects or couples the ring gear of second planetary gear set 22 and the sun gear of third planetary gear set 24 to the ring gear of third planetary gear set 24 and the sun gear of fourth planetary gear set 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication the shifting elements of automatic transmission 10. Thus, electronic control unit 28 may selectively adjust the shifting elements between the engaged configuration and the disengaged configuration. In such a manner, electronic control unit 28 may shift automatic transmission 10 between gears during operation of automatic transmission 10, e.g., based at least in part on signals from input speed sensor 30 and output speed sensor 32.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", and eighth gear "8". The reverse gear is labeled "R". In table 200, cells filled with a dot indicate the engaged configuration, and blank cells indicate the disengaged configuration. Thus, e.g., multidisc brake A, multidisc brake B and multidisc clutch C are in the engaged configuration in first gear. As another example, multidisc brake A, multidisc brake B and multidisc clutch E are in the engaged configuration in second gear. In the third gear, multidisc brake B and multidisc clutch C and multidisc clutch E are in the engaged configuration. The remainder of the shifting scheme for automatic transmission 10 is shown in FIG. 2.

As discussed above, automatic transmission 10 includes eight forward gears and one reverse gear. Thus, automatic transmission 10 is generally referred to as a "eight-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, nine forward gears, etc.

Figure 3:
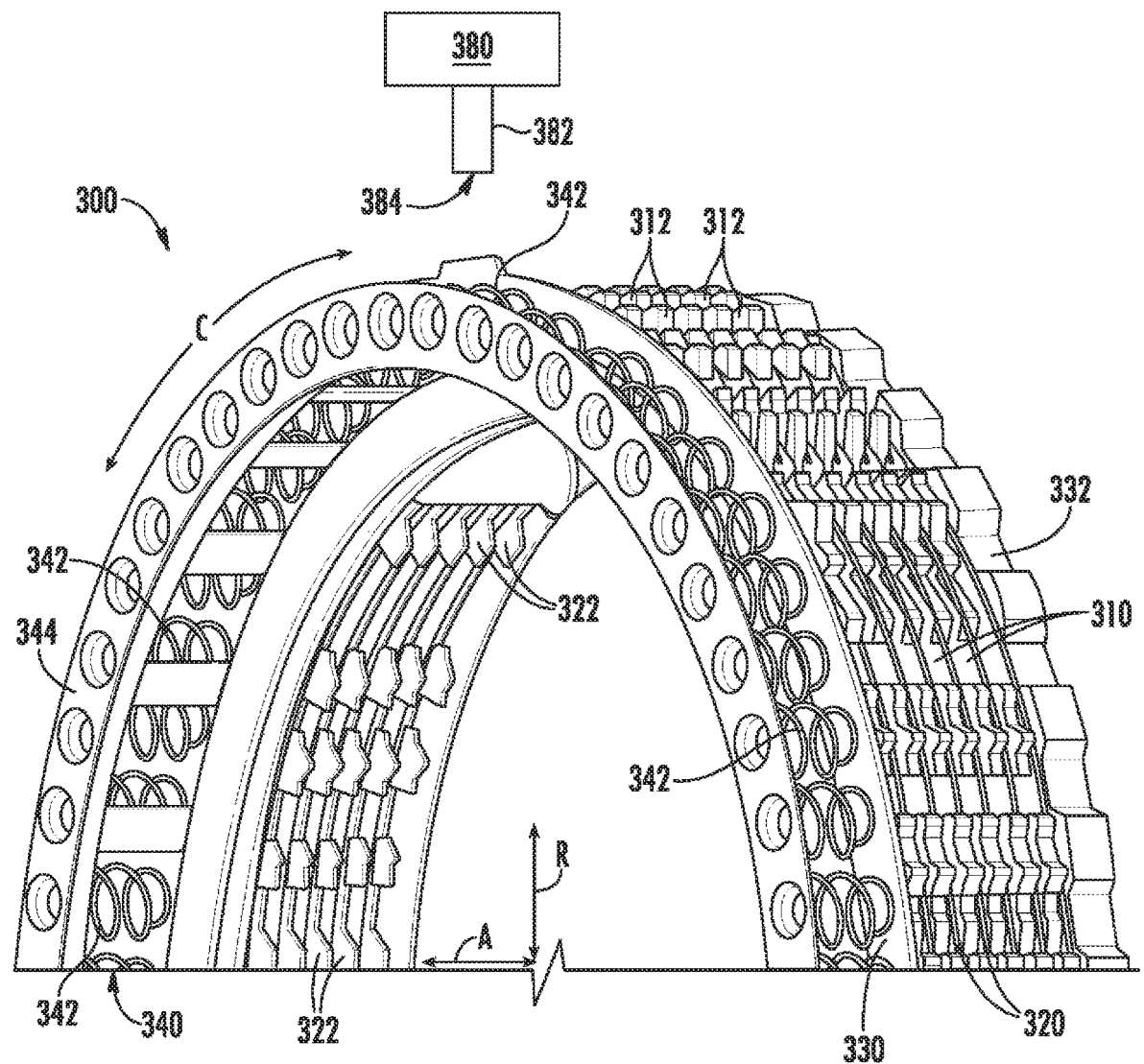
FIG. 3 is a partial perspective view of a friction shifting element according to an example embodiment of the present subject matter.
Figure 4:
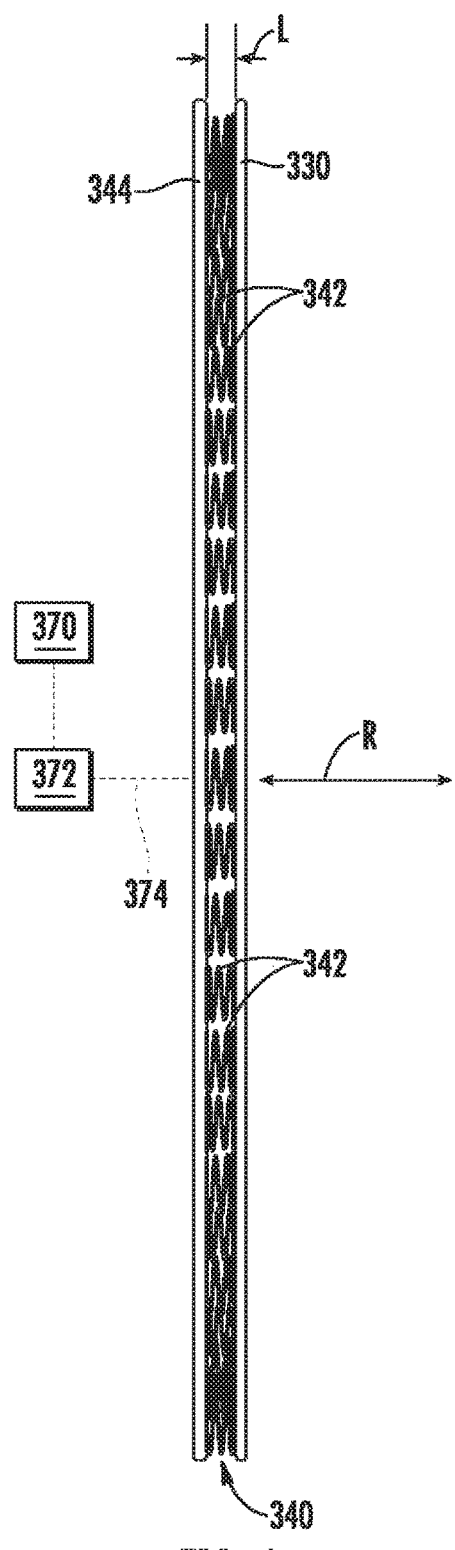
FIG. 4 is a side elevation view of a shape-memory alloy shifter of the example friction shifting element of FIG. 3 with the shape-memory alloy shifter shown retracted.
Figure 5:
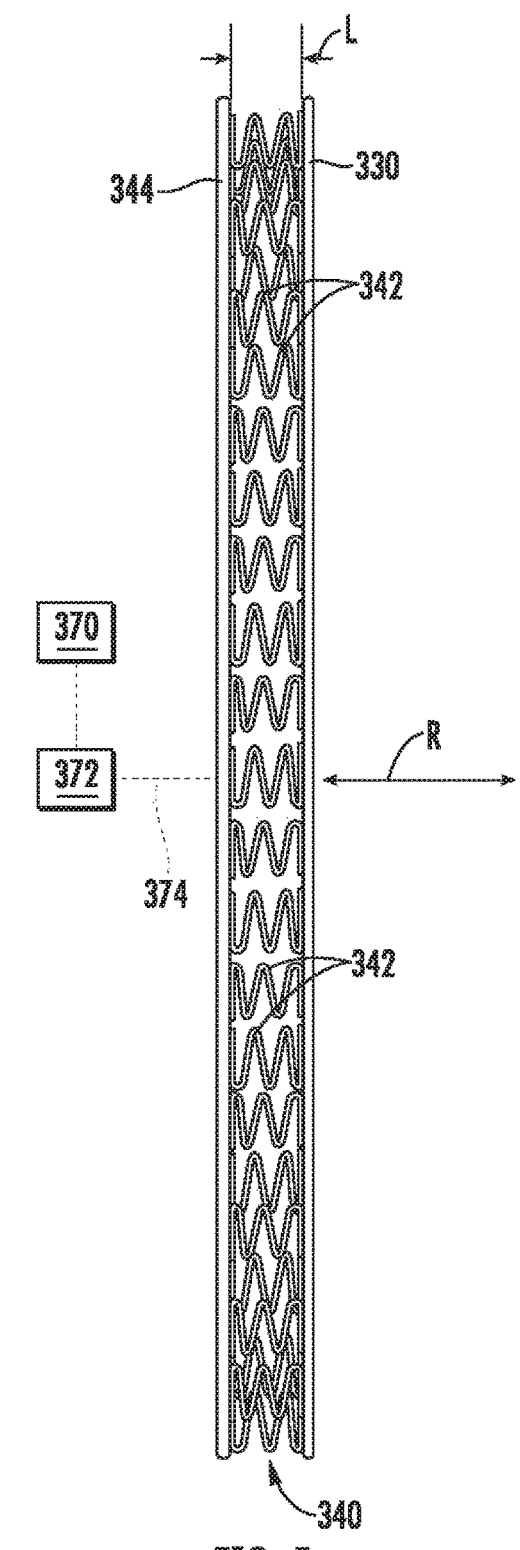
FIG. 5 is a side elevation view of the shape-memory alloy shifter of the example friction shifting element of FIG. 3 with the shape-memory alloy shifter shown extended.

FIG. 3 is a partial perspective view of a friction shifting element 300 according to an example embodiment of the present subject matter. FIG. 4 is a side elevation view of a shape-memory alloy shifter 340 of friction shifting element 300 with shape-memory alloy shifter 340 shown retracted. FIG. 5 is a side elevation view of shape-memory alloy shifter 340 of friction shifting element 300 with shape-memory alloy shifter 340 shown extended. Friction shifting element 300 may be used in any suitable automatic transmission. For example, friction shifting element 300 may be used in automatic transmission 10 as multidisc brake or multidisc brake B. Thus, while described in greater detail below in the context of automatic transmission 10, it will be understood that friction shifting element 300 may be used in or with any, other suitable transmission, such as a six-speed automatic transmission, a nine-speed automatic transmission, a ten-speed automatic transmission, etc., in alternative exemplary embodiments. As discussed in greater detail below, friction shifting element 300 includes features for assisting with shifting friction shifting element 300 between the engaged configuration and the disengaged configuration, e.g., without using hydraulic fluid.

As may be seen in FIG. 3, friction shifting element 300 includes a plurality of first friction plates 310 and a plurality of second friction plates 320. First friction plates 310 are interleaved with second friction plates 320. Thus, e.g., first friction plates 310 and second friction plates 320 may be alternately stacked within friction shifting element 300. First friction plates 310 may be constructed of a suitable material, such as steel. In addition, second friction plates 320 may be constructed of a suitable material, such as steel, and may also include a suitable facing, such as a resin, ceramic or cellulose.

First friction plates 310 are mounted or fixed to any suitable component of automatic transmission 10, e.g., such that first friction plates 310 do not rotate relative to such component. For example, each first friction plate 310 may define a plurality of splines 312. Splines 312 of first friction plates 310 may extend outwardly along a radial direction R and may be received within transmission housing 16, e.g., when friction shifting element 300 is one of multidisc brake A and multidisc brake B. Thus, first friction plates 310 may be rotationally fixed relative to transmission housing 16.

Second friction plates 320 are mounted or fixed to any suitable component of automatic transmission 10, e.g., such that second friction plates 320 do not rotate relative to such component. For example, each second friction plate 320 may define a plurality of splines 322. Splines 322 of second friction plates 320 may extend inwardly along the radial direction R and may be received within a shaft coupled to a gear of a planetary gear set. For example, when friction shifting element 300 is multidisc brake A, splines 322 of second friction plates 320 may be received within a shaft coupled to the sun gear of first planetary gear set 20 and the sun gear of second planetary gear set 22. Thus, second friction plates 320 may be rotationally fixed relative to the sun gear of first planetary gear set 20 and the sun gear of second planetary gear set 22. As another example, when friction shifting element 300 is multidisc brake B, splines 322 of second friction plates 320 may be received within a shaft coupled to the ring gear of first planetary gear set 20. Thus, second friction plates 320 may be rotationally fixed relative to the ring gear of first planetary gear set 20.

As discussed above, friction shifting element 300 is adjustable between an engaged configuration and a disengaged configuration. In the engaged configuration, first friction plates 310 contact and engage second friction plates 320, e.g., such that first friction plates 310 and second friction plates 320 rotate at a common angular velocity about an axis of rotation A and/or transfer torque. Conversely, in the disengaged configuration, first friction plates 310 does not engage second friction plates 320, e.g., such that first friction plates 310 and second friction plates 320 may rotate relative to each other about the axis of rotation A and/or do not transfer torque. It will be understood that friction shifting element 300 is also adjustable to a slip configuration in which first friction plates 310 and second friction plates 320 may rotate relative to each other about the axis of rotation A but still transfer torque.

Friction shifting element 300 also includes an actuating plate 330 and an end plate 332. Actuating plate 330 is positioned at one end of friction shifting element 300 along the axis of rotation A. For example, actuating plate 330 may be positioned opposite end plate 332 about first friction plates 310 and second friction plates 320 along the axis of rotation A. End plate 332 may be fixed to transmission housing 16, and first friction plates 310 and second friction plates 320 may be compressed together between actuating plate 330 and end plate 332 in the engaged configuration. As discussed in greater detail below, actuating plate 330 is configured for moving axially, e.g., along the axis of rotation A, in order to shift friction shifting element 300 between the engaged and disengaged configurations.

Friction shifting element 300 further includes a shape-memory alloy shifter 340. Shape-memory alloy shifter 340 is coupled to actuating plate 330 and is configured for selectively adjusting friction shifting element 300 between the engaged configuration and the disengaged configuration. For example, an electrical current may be supplied to shape-memory alloy shifter 340, and shape-memory alloy shifter 340 may expand as shown in FIG. 5 in order to move actuating plate 330 towards first friction plates 310 and second friction plates 320 along the axis of rotation A. The electrical current to shape-memory alloy shifter 340 may be subsequently terminated, and shape-memory alloy shifter 340 may contract as shown in NG. 4 in order to move actuating plate 330 away from first friction plates 310 and second friction plates 320 along the axis of rotation A. Such movement of actuating plate 330 selectively engages first friction plates 310 with second friction plates 320 in order to shift friction shifting element 300 between the engaged and disengaged configurations. In particular, shape-memory alloy shifter 340 positions actuating plate 330 such that first friction plates 310 and second friction plates 320 are compressed together in the engaged configuration. Conversely, shape-memory alloy shifter 340 positions actuating plate 330 such that first friction plates 310 and second friction plates 320 are not compressed together in the disengaged configuration. In such a manner, shape-memory alloy shifter 340 may move shifting clutch 320 in order to shift friction shifting element 300 between the engaged and disengaged configurations.

Shape-memory alloy shifter 340 may have a suitable shape. For example, shape-memory alloy shifter 340 may include a plurality of shape-memory alloy helical coil springs 342. Shape-memory alloy helical coil springs 342 may be distributed along a circumferential direction C. In particular, shape-memory alloy helical coil springs 342 may be mounted to a spring carrier 344, and shape-memory alloy helical coil springs 342 may be uniformly distributed along the circumferential direction C on spring carrier 344. Spring carrier 344 may be positioned opposite actuating plate 330 about shape-memory alloy helical coil springs 342 along the axis of rotation A. In certain example embodiments, one end of each shape-memory alloy helical coil spring 342 is attached (e.g., hooked or fastened) to spring carrier 344 and the opposite end of each shape-memory alloy helical coil spring 342 is attached (e.g., hooked or fastened) to actuating plate 330.

Shape-memory alloy shifter 340 may include a suitable number of shape-memory alloy helical coil springs 342. For example, shape-memory alloy shifter 340 may include no less than twenty (20) shape-memory alloy helical coil springs 342. Such number of shape-memory alloy helical coil springs 342 may assist actuating plate 330 with applying a uniform force along the axis of rotation A during compression of first friction plates 310 and second friction plates 320 in the engaged configuration and thereby assist with smoothly shifting friction shifting element 300 between the engaged and disengaged configurations.

Friction shifting element 300 also includes a controller 370, such as electronic control unit 28, and a power supply 372, such as an alternator or battery, for regulating operation of shape-memory alloy shifter 340. Controller 370 and power supply 372 are shown schematically in FIGS. 4 and 5. Power supply 372 is electrically coupled to shape-memory alloy shifter 340, e.g., via suitable wiring, such that power supply 372 selectively directs an electrical current to shape-memory alloy shifter 340. For example, a conducting wire 274 may extend around spring carrier 344 while contacting each shape-memory alloy helical coil spring 342. Controller 370 is in operative communication with power supply 372 such that controller 370 selectively operates power supply 372 in order to supply the electrical current to shape-memory alloy shifter 340. Controller 370 may also regulate the magnitude of the electrical current from power supply 372 to shape-memory alloy shifter 340.

Controller 370 is configured for selectively actuating power supply 372 in order to adjust friction shifting element 300 between the engaged and disengaged configurations. For example, controller 370 may direct power supply 372 to direct an electrical current to shape-memory alloy shifter 340 in order to extend actuating plate 330 towards first friction plates 310 and second friction plates 320 and thereby shift friction shifting element 300 to the engaged configuration. As another example, controller 370 may deactivate power supply 372 in order to terminate the electrical current to shape-memory alloy shifter 340 and retract actuating plate 330 from first friction plates 310 and second friction plates 320 such that friction shifting element 300 shifts to the disengaged configuration. Thus, controller 370 may adjust friction shilling element 300 between the engaged and disengaged configurations by selectively directing electrical current from power supply 372 to shape-memory alloy shifter 340.

A length L of shape-memory alloy shifter 340 along the axis of rotation A changes between the engaged and disengaged configurations as shown in FIGS. 4 and 5. For example, the length L of shape-memory alloy shifter 340 in the engaged configuration (FIG. 5) may be no less than twice the length L of shape-memory alloy, shifter 340 in the disengaged configuration (FIG. 4).

Friction shifting element 300 may also include a hydraulic pump 380. Hydraulic pump 380 is shown schematically in FIG. 3. Hydraulic pump 380 is operable to flow hydraulic fluid, such as oil, such that the hydraulic fluid is flowable over first friction plates 310, second friction plates 320 and shape-memory alloy shifter 340. For example, an exit 384 of a supply conduit 382 that extends from hydraulic pump 380 may be positioned over first friction plates 310, second friction plates 320 and shape-memory alloy shifter 340, and the hydraulic fluid may from hydraulic pump 380 may flow out of supply conduit 382 at the exit 384 of supply conduit 382 and flow downwardly onto first friction plates 310, second friction plates 320 and shape-memory alloy shifter 340. Exit 384 of supply conduit 382 may be sized and shaped to cover first friction plates 310, second friction plates 320 and shape-memory alloy shifter 340. Thus, first friction plates 310, second friction plates 320 and shape-memory alloy shifter 340 may be hydraulically lubricated and/or cooled, e.g., by a common hydraulic pump within automatic transmission 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automatic transmission, comprising:
   a plurality of planetary gear sets; and
   a friction shifting element that defines an axial direction, the friction shifting element comprising
      a plurality of first friction plates;
      a plurality of second friction plates interleaved with the plurality of first friction plates;
      an actuating plate; and
      a shape-memory alloy shifter coupled to the actuating plate, the shape-memory alloy shifter configured for moving the actuating plate along the axial direction between an engaged configuration and a disengaged configuration,
      wherein the actuating plate compresses the plurality of first friction plates and the plurality of second friction plates together when the actuating plate is in the engaged configuration, and
      wherein one of the plurality of first friction plates and the plurality of second friction plates is fixed to a gear of the plurality of planetary gear sets.

2. The automatic transmission of claim 1, wherein the shape-memory alloy shifter comprises a plurality of shape-memory alloy helical coil springs, the plurality of shape-memory alloy helical coil springs distributed along a circumferential direction.

3. The automatic transmission of claim 2, wherein the plurality of shape-memory alloy helical coil springs are mounted to a spring carrier that is positioned opposite the actuating plate about the plurality of shape-memory alloy helical coil springs along the axial direction.

4. The automatic transmission of claim 2, wherein the plurality of shape-memory alloy helical coil springs comprises no less than twenty shape-memory alloy helical coil springs.

5. The automatic transmission of claim 1, further comprising a power supply electrically coupled to the shape-memory alloy shifter, the power supply configured for directing an electric current through the shape-memory alloy shifter in the engaged configuration.

6. The automatic transmission of claim 5, wherein the electric current from the power supply heats the shape-memory alloy shifter in order to shift the actuating plate along the axial direction between the disengaged configuration and the engaged configuration.

7. The automatic transmission of claim 1, wherein the other of the plurality of first friction plates and the plurality of second friction plates is fixed to a transmission housing or another gear of the plurality of planetary gear sets.

8. The automatic transmission of claim 1, further comprising a hydraulic pump operable to flow hydraulic fluid to the friction shifting element such that the hydraulic fluid is flowable over the plurality of first friction plates, the plurality of second friction plates and the shape-memory alloy shifter.

9. The automatic transmission of claim 1, wherein the friction shifting element further comprises an end disk positioned opposite the actuating plate about the plurality of first friction plates and the plurality of second friction plates along the axial direction.

10. A friction shifting element defining an axial direction, the friction shifting element comprising:
a plurality of first friction plates;
a plurality of second friction plates interleaved with the plurality of first friction plates;
an actuating plate; and
a shape-memory alloy shifter coupled to the actuating plate, the shape-memory alloy shifter configured for moving the actuating plate along the axial direction between an engaged configuration and a disengaged configuration,
wherein the actuating plate compresses the plurality of first friction plates and the plurality of second friction plates together when the actuating plate is in the engaged configuration.

11. The friction shifting element of claim 10, wherein the shape-memory alloy shifter comprises a plurality of shape-memory alloy helical coil springs, the plurality of shape-memory alloy helical coil springs distributed along a circumferential direction.

12. The friction shifting element of claim 11, wherein the plurality of shape-memory alloy helical coil springs are mounted to a spring carrier that is positioned opposite the actuating plate about the plurality of shape-memory alloy helical coil springs along the axial direction.

13. The friction shifting element of claim 11, wherein the plurality of shape-memory alloy helical coil springs comprises no less than twenty shape-memory alloy helical coil springs.

14. The friction shifting element of claim 10, further comprising a power supply electrically coupled to the shape-memory alloy shifter, the power supply configured for directing an electric current through the shape-memory alloy shifter in the engaged configuration.

15. The friction shifting element of claim 14, wherein the electric current from the power supply heats the shape-memory alloy shifter in order to shift the actuating plate along the axial direction between the disengaged configuration and the engaged configuration.

16. The friction shifting element of claim 10, further comprising a hydraulic pump operable to flow hydraulic fluid over the plurality of first friction plates, the plurality of second friction plates and the shape-memory alloy shifter.

17. The friction shifting element of claim 10, further comprising an end disk positioned opposite the actuating plate about the plurality of first friction plates and the plurality of second friction plates along the axial direction.

* * * * *